(12) United States Patent
Gao et al.

(10) Patent No.: US 8,874,739 B2
(45) Date of Patent: *Oct. 28, 2014

(54) SELECTIVELY MONITORING A SERVICE ENDPOINT OF AN INFORMATION TECHNOLOGY SYSTEM

(75) Inventors: Peng Gao, Beijing (CN); Peng Han, Beijing (CN); Hang Xiao, Beijing (CN); Xia Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/595,629

(22) Filed: Aug. 27, 2012

(65) Prior Publication Data

US 2012/0324104 A1 Dec. 20, 2012

Related U.S. Application Data

(63) Continuation of application No. 13/299,374, filed on Nov. 18, 2011, now Pat. No. 8,719,406.

(30) Foreign Application Priority Data

Nov. 30, 2010 (CN) .......................... 2010 1 0580356

(51) Int. Cl.
*G06F 15/173* (2006.01)
*H04L 12/24* (2006.01)
*H04L 12/26* (2006.01)

(52) U.S. Cl.
CPC ......... *H04L 43/0876* (2013.01); *H04L 43/0888* (2013.01); *H04L 43/0811* (2013.01); *H04L 41/046* (2013.01); *H04L 43/0817* (2013.01)
USPC ........................... 709/224; 709/225; 709/227

(58) Field of Classification Search
CPC ... H04L 29/08072; H04L 29/06; H04L 43/00; H04L 12/2602; H04L 41/22
USPC ......................................... 709/224, 225, 227
See application file for complete search history.

(56) References Cited

U.S. PATENT DOCUMENTS 7,496,655 B2 * 2/2009 Gopalan et al. ................ 709/224
7,725,570 B1 * 5/2010 Lewis ........................... 709/224

(Continued)

FOREIGN PATENT DOCUMENTS

| CN | 101505243 A | 8/2009 | |
| CN | 101789890 A | 7/2010 | |
| WO | WO 2005015404 A2 * | 2/2005 | .............. G06F 11/30 |
| WO | 2007048726 A1 | 5/2007 | |

OTHER PUBLICATIONS

Mos, Adrian. (2004). A framework for adaptive monitoring and performance management of component-based enterprise applications (Doctoral dissertation, Dublin City University). Retrieved from http://doras.dcu.ie/18093/.*

(Continued)

*Primary Examiner* — Lynn Feild
*Assistant Examiner* — Timothy Sowa
(74) *Attorney, Agent, or Firm* — Yudell Isidore Ng Russell PLLC; Diana Roberts

(57) ABSTRACT

The present invention relates to the technical field of performance management for IT systems. More particularly, the present invention relates to a technology of performing monitoring on demand for a complex IT system. According to one aspect of the present invention, there is provided a method of system monitoring that includes: monitoring a performance parameter of a client of the system, determining, based on the performance parameter of the client, whether to monitor a service endpoint directly called by the client, locating the service endpoint to be monitored in response to a determination to monitor the service endpoint directly called by the client, and monitoring a performance parameter of the service endpoint.

4 Claims, 5 Drawing Sheets

(56) References Cited

U.S. PATENT DOCUMENTS

| | | | |
|---|---|---|---|
| 7,865,584 B2* | 1/2011 | Grossner et al. | 709/223 |
| 2003/0120539 A1* | 6/2003 | Kourim et al. | 705/11 |
| 2004/0257985 A1* | 12/2004 | Sahai et al. | 370/229 |
| 2006/0074946 A1* | 4/2006 | Pham | 707/100 |
| 2007/0226228 A1* | 9/2007 | Her et al. | 707/10 |
| 2007/0230361 A1* | 10/2007 | Choudhury | 370/250 |
| 2007/0294399 A1* | 12/2007 | Grossner et al. | 709/224 |
| 2008/0104230 A1* | 5/2008 | Nasuto et al. | 709/224 |
| 2009/0106571 A1* | 4/2009 | Low et al. | 713/310 |
| 2009/0164621 A1* | 6/2009 | Kothari et al. | 709/224 |
| 2009/0237240 A1* | 9/2009 | Leung et al. | 340/540 |
| 2010/0049559 A1* | 2/2010 | Carbone et al. | 705/7 |
| 2011/0314326 A1* | 12/2011 | Mahajan et al. | 714/4.11 |

OTHER PUBLICATIONS

Kotz, David, et al. (2002). Performance analysis of mobile agents for filtering data streams on wireless networks. Mobile Networks and Applications, 7(2), 163-174.*

Taylor, Valerie, et al. (2003). Prophesy: an infrastructure for performance analysis and modeling of parallel and grid applications. ACM SIGMETRICS Performance Evaluation Review, 30(4), 13-18.*

Woodside, Murray, et al. (Jun. 2006). Service system resource management based on a tracked layered performance model. In Autonomic Computing, 2006. ICAC'06. IEEE International Conference on (pp. 175-184). IEEE.*

U.S. Appl. No. 13/299,374 entitled "Amonitoring an Information Technology System"; Non-final office action dated Jun. 10, 2013 (20 pg).

U.S. Appl. No. 13/299,374 entitled "Amonitoring an Information Technology System"; Notice of Allowance action dated Dec. 2013 (9 pg).

Peng Gao et al., China Patent Application 201010580356.9; Office Action dated Dec. 24, 2013 (6 pg).

* cited by examiner

SELECTIVELY MONITORING A SERVICE ENDPOINT OF AN INFORMATION TECHNOLOGY SYSTEM

This application is a continuation of U.S. patent application Ser. No. 13/299,374 entitled "MONITORING AN INFORMATION TECHNOLOGY SYSTEM" by Peng Gao et al. filed Nov. 18, 2011 now U.S. Pat. No. 8,719,406, the disclosure of which is hereby incorporated herein by reference in its entirety for all purposes.

FIELD OF THE INVENTION

The present invention relates to the technical field of Information Technology (IT) system performance management. More particularly, the present invention relates to the technology of performing monitoring on demand for a complex IT system.

BACKGROUND OF THE INVENTION

System monitoring is an important task in IT system management. Through system monitoring, a system administrator may understand the running state of the system and detect a problem in the system, so as to timely solve the problem and to further guarantee that the system operates normally and/or conforms to a requirement prescribed in the Service Level Agreement (SLA).

With the rapid development of cloud computing and service-oriented architecture technologies, a plurality of applications are integrated in an IT system to provide services to users. For example, a plurality of support applications may be employed at the backend of an online banking service. Such support applications include, but are not limited to, services for managing databases, account queries, services, transfers, and cross-bank settlements. To integrally monitor the online banking support services and to promptly locate the source of a failure upon its occurrence in an application, a corresponding monitor agent is deployed and activated for each application in the system. However, the deployment and running of a great number of monitoring proxies consumes a considerable amount of system resources. Moreover, the running of these monitoring proxies can even directly cause a malfunction of the IT system. Therefore, in determining the proper scope of deploying monitor proxies, a balance must be struck between the IT system performance and the resource consumption caused by deploying monitors.

SUMMARY OF THE INVENTION

There is provided, in a first form, a method for system monitoring. The method includes monitoring a performance parameter of a client of a system. Based on the performance parameter of the client, a determination is made whether to monitor a service endpoint directly called by the client. If so, the service endpoint to be monitored is located, and the performance parameter of the service endpoint is monitored.

There is also provided, in a second form, a system for system monitoring. The system includes a client monitoring module configured to monitor a performance parameter of a client of a system, a first determining module configured to determine, based on the performance parameter of the client, whether to monitor a service endpoint directly called by the client, a service endpoint locating module configured to locate the service endpoint to be monitored if it is determined to monitor the service endpoint directly called by the client, and a service endpoint monitoring module configured to monitor a performance parameter of the service endpoint.

There is also provided, in a third form, a computer program product for system monitoring. The computer program product includes a computer readable storage medium and program code stored within the computer readable storage medium that, when executed, causes a processor to perform: monitoring a performance parameter of a client of a system, determining, based on the performance parameter of the client, whether to monitor a service endpoint directly called by the client, locating the service endpoint to be monitored if it is determined to monitor the service endpoint directly called by the client, and monitoring a performance parameter of the service endpoint.

The above as well as additional features of the present invention will become apparent in the following detailed written description.

BRIEF DESCRIPTION OF THE DRAWINGS

Aspects of the invention itself will best be understood by reference to the following detailed description of an illustrative embodiment when read in conjunction with the accompanying drawings, where.

DETAILED DESCRIPTION OF EMBODIMENTS

Hereinafter, a method, system, and computer program product for determining a node to be monitored according to the present invention will be described in detail through preferred embodiments with reference to the drawings.

Figure 1:
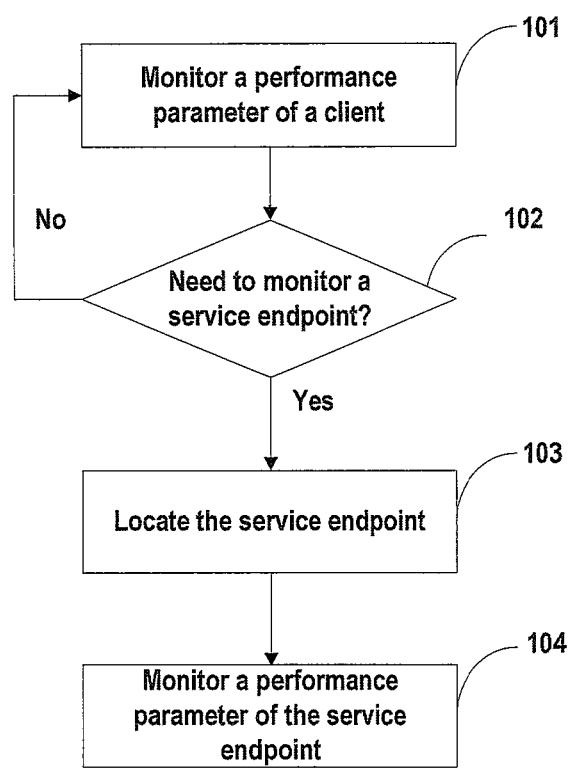
FIG. 1 illustrates a high-level logical flow chart of an exemplary method of system monitoring in accordance with an embodiment of the present invention.

FIG. 1 illustrates a high-level flow chart of an exemplary method of system monitoring according to one embodiment of the present invention. Each block in the flow chart represents a particular step in the method. The method of FIG. 1 starts at block 101, which depicts the monitoring of a performance parameter of a client. In addition to clients, a complex IT system typically includes a plurality of sub-services or sub-applications. However, during the initial stage of the method of FIG. 1, only a performance parameter of a client is monitored since it would be an inefficient use of resources to deploy monitors on all sub-services or sub-applications. According to one embodiment of the present invention, a performance parameter of a client is a Key Performance Indicator (KPI), which includes, but is not limited to, parameters capable of representing client performance, such as response time, error probability, connection error, and throughput. Those skilled in the art should appreciate that monitoring a performance parameter may be implemented by deploying a monitor agent and activating the monitor agent.

From block 101, the method as illustrated in FIG. 1 proceeds to decision block 102. At decision block 102, it is determined whether to monitor a service endpoint directly called by the client. The determining step is based on the performance parameter of a client obtained by the monitoring depicted in block 101. According to one embodiment of the present invention, the basis for determining may be a predefined service level agreement (SLA). For example, a predefined client SLA may prescribe that the response time should not exceed a 0.5 ms delay. If the response time value obtained by monitoring the client is 0.8 ms (thus exceeding the 0.5 ms delay), then at decision block 102, it is then determined to monitor the service endpoint directly called by the client and the method proceeds to block 103. It should be noted that the client does not directly call all sub-services or sub-applications of the IT system (e.g., a client generally does not call a database at the utmost infrastructure layer), because the IT system has a hierarchical call relation. When the value of the monitored performance parameter cannot satisfy the requirement set by the predefined client SLA, monitoring is deployed and activated only on the service endpoint that needs to be monitored and that is directly called by the client (i.e., determining the system monitoring scope hierarchically). Moreover, in the event that the client directly calls a plurality of service endpoints, then the determination of which service endpoint to activate its monitoring is based on the monitored performance parameter of the client, instead of activating monitoring on all service endpoints directly called by the client. Those skilled in the art should understand that a specific determining criterion may vary based on the specific condition of the IT system. Thus, the implementation of SLA for determining whether or not to monitor a service endpoint is merely one possible embodiment as proposed by the present invention.

When the determining result at block 102 is yes, (i.e., there is a need to monitor a service endpoint) then at block 103, there is depicted that the service endpoint directly called by the client is located. According to one embodiment of the present invention, locating the service endpoint directly called by the client refers to determining which particular monitor agent is to be deployed to the service endpoint or to be activated. Since different monitor proxies monitor different applications, an address identification of the service endpoint is first determined, and a name and version number of a specific application running on the service endpoint is then determined so as to correctly deploy and activate the monitor agent. A method of locating a service endpoint directly called by the client will be described in greater detail with reference to FIG. 2.

From block 103, the method as illustrated in FIG. 1 proceeds to block 104. At block 104, the performance parameter of the service endpoint as directly called by the client is monitored. The specific manner and the performance parameter that is likely to be selected are similar to those used during monitoring the client at step 101.

It should be noted that the "client" and "service endpoint" are substantively relative concepts in which the service endpoint as monitored at step 104 becomes a new "client" with respect to a subordinate service endpoint which it directly calls, and so forth. When monitoring the service endpoint directly called by the client at step 104, if it is determined to monitor a subordinate service endpoint directly called by the service endpoint, then steps 102 to 104 may be repeated iteratively. Such iterative process will be illustrated more in-depth in the following depiction with reference to FIG. 2.

Even if there are no operations of subsequent iterative repetition, those skilled in the art should appreciate that the technical effect of problem-oriented, hierarchically-deploying monitors may also be implemented as required: initially only deploying monitors at the client, and then once a problem is monitored, deploying corresponding monitors to the service endpoint which it directly calls. Using this method, resource consumption caused by widespread deployment of monitors is decreased. Moreover, the method also avoids a manual adjustment of the system monitoring scope. Manual adjustments of monitoring scope are typically associated with a high error probability.

Figure 2:
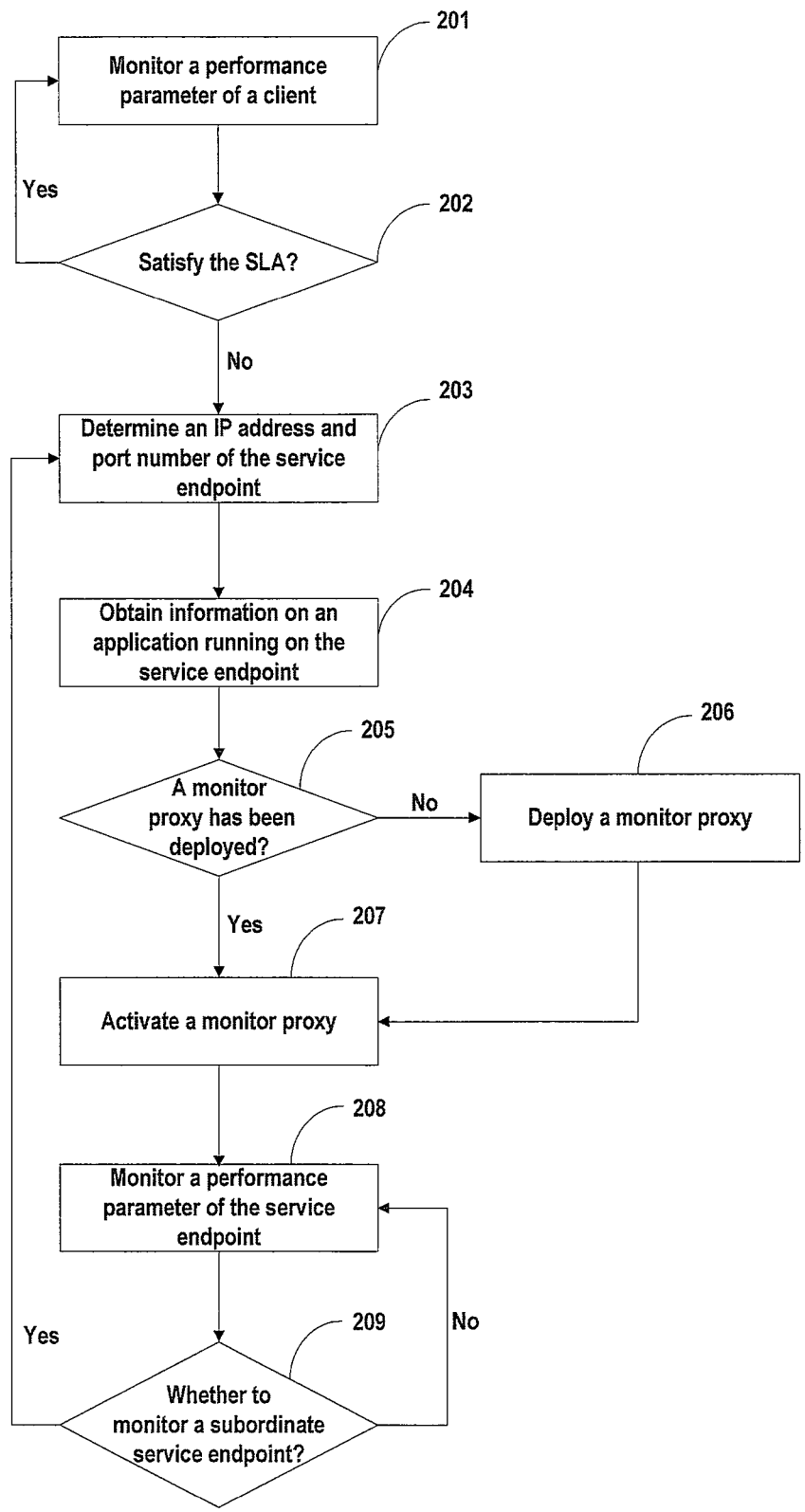
FIG. 2 illustrates a high-level logical flow chart of an exemplary method of system monitoring in accordance with another embodiment of the present invention.

FIG. 2 illustrates a high-level flow chart of an exemplary method of system monitoring according to another embodiment of the present invention. The method of FIG. 2 starts at block 201, which depicts the monitoring of a performance parameter of the client. It should be noted that the monitoring step depicted in block 201 corresponds to the same step depicted in block 101 of FIG. 1 and described earlier.

From block 201, the method proceeds to decision block 202, which depicts a determination of whether the monitored performance parameter of a client satisfies a predefined service level standard SLA. If the determining result is "yes" (i.e., indicating that the IT system is operating normally), deployment of additional monitors is unnecessary, and the process returns to step 201 to continue monitoring the performance parameter of the client. If the determining result from decision block 202 is "no", IT system performance is problematic. At this point in the monitoring process, since the currently deployed monitors are only monitoring the client, it is impossible to determine the specific sub-application associated with the problem. Therefore, additional monitors are deployed (i.e., expanding the monitoring scope) to detect the accurate location of the problem.

Thus, if the determining result at decision block 202 is "no", then the method proceeds to block 203, which depicts the determining of an IP address and port number of the service endpoint directly called by the client. According to one embodiment of the present invention, the information regarding IP address and port number of the server endpoint is obtained from a monitor agent deployed by the client. The following is an example of Service Endpoint, where a Service Resource Locator (SRL) of this service will be obtained by parsing the <location> tag in the <port> tag, which is in the <service> tag in the WSDL file of the Web Service, this SRL uniquely marking this service FOOSAMPLEService.

```
<service name="FOOSAMPLEService">
    <port name="SimplePort" binding="wsdlns:SimpleBinding">
        <soap:address
        location="http://carlos:8080/FooSample/FooSample.asp"/>
    </port>
</service>
```

However, the particular monitor agent to be deployed to the service endpoint cannot be determined by only obtaining the IP address and port number (or SRL) of the service endpoint directly called by the client. Thus, the process continues to block 204, which depicts the step of determining information regarding the application running on the service endpoint. According to one embodiment of the present invention, information regarding the application running on the service endpoint includes a name and a version number of the application. According to one embodiment of the present invention, obtaining information regarding the application running on the service endpoint is a process of sending a query request to the service endpoint to obtain a Transmission Control Protocol (TCP) port serving the service endpoint through the IP address and port number of the service endpoint as obtained in the step depicted at block 203 (thereby obtaining the name and version number of the application running on the service port). Those skilled in the art should appreciate that the specific manner and format of sending a query request are dependent upon different system environments. For example, through remote execution, the execution program on the IP and port is queried (e.g., Java. exe whole path execution name of the WebSphere Application Server (WAS)), and then the software name and version information are obtained.

From block 204, the method of FIG. 2 proceeds to decision block 205. At decision block 205, there is depicted a determination of whether a monitor agent/proxy corresponding to the application with a determined version running on the service endpoint has been deployed. If the determining result is "no", then the corresponding monitor agent is deployed (as depicted in block 206), and the process continues to block 207, which depicts the corresponding monitor agent being activated so as to activate monitoring of the performance parameter of the service endpoint. However, if the determining result at decision block 205 is "yes", then the method proceeds to block 207, which depicts the deployed (but in an inactivated state) corresponding monitor agent being directly activated so as to activate monitoring of the performance parameter of the service endpoint. It should be noted that the reason for the possible existence of a deployed but inactivated monitor agent is that the service endpoint might have been monitored previously. However, since the monitored performance parameter of the client has been changed back to a normal situation, according to one embodiment of the present invention, it would be unnecessary to monitor this service endpoint, thereby inactivating the corresponding monitor agent. As a result of the inactivation of the corresponding monitor agent, it is likely that the deployment of the monitor agent is cancelled after inactivation. It should be further noted that according to one embodiment of the present invention, at decision block 205, the corresponding monitor is found by comparing the software name and version information as obtained at step 204 with the information in a predefined monitor agent information element data base. Then it is determined whether the monitor agent has been deployed based on whether the matched monitor agent has been found (this comparing step is not illustrated in FIG. 2). Table 1 below provides an instance of a monitor agent information element database:

TABLE 1

| Application Name | Monitor Agent |
| --- | --- |
| WAS 5.3.0.0 | ITCAM for WAS 5.0 |
| WAS 6.1.0.0 | ITCAM for WAS 6.0 |
| . . . | . . . |

After the monitor agent of the service endpoint directly called by the client is activated at block 207, the performance parameter of the service endpoint is monitored, as depicted in block 208. From block 208, the method continues to decision block 209, which depicts a determination of whether to monitor a subordinate service endpoint directly called by the service endpoint. Such a determination in decision block 209 is similar to the determination shown earlier at decision block 202. If the determining result at decision block 209 is "no", then the process returns to block 208 to continue monitoring the performance parameter of the service endpoint. However, if the determining result at decision block 209 is "yes", then the process returns to block 203 to repeat the operations depicted in blocks 203 to 209. This allows for a hierarchical adjustment of the deployment scope of the monitor agent by following a problem-oriented, iterative approach on an as-needed basis.

It should be noted that although FIG. 2 illustrates one iteration of the exemplary process, those skilled in the art can implement a technical solution of hierarchically and iteratively adjusting the system monitoring scope starting from the client according to the method of FIG. 1 or FIG. 2 based on the same principle. The service endpoint, with respect to a subordinate service endpoint which it directly calls, is termed a "client;" while the "client," with respect to its superior endpoint which it directly calls, is a termed a "service endpoint."

It should be further noted that although FIG. 1, FIG. 2, and the above depiction only describe the process of hierarchically expanding the system monitoring scope by starting from the client, the invention is not limited in this regard. Rather, the idea of dynamically, iteratively, and hierarchically adjusting the system monitoring scope as proposed by this invention can not only expand the monitoring scope, but also can dynamically, iteratively, and hierarchically narrow the system monitoring scope based on the same principle. In a complex IT system, especially in a cloud computing environment, the monitoring of the system is a largely dynamic process. Using the method illustrated in FIG. 2 as an example, if it is known from the monitoring at decision block 202 that the performance parameter of the current client has satisfied the SLA requirement, and the service endpoint directly called by the client is currently under monitoring, then monitoring of the service endpoint directly called by the client may be stopped so as to save system resources.

Figure 3:
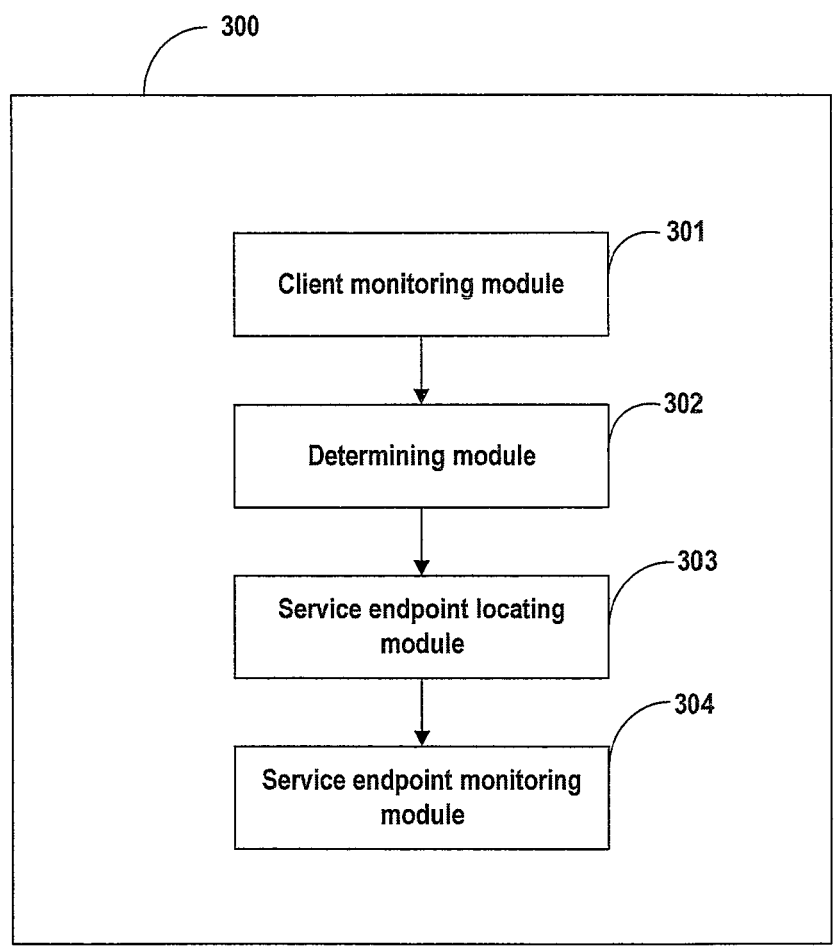
FIG. 3 illustrates a high-level block diagram of an exemplary apparatus for system monitoring in accordance with an embodiment of the present invention.

FIG. 3 illustrates a high-level block diagram of an apparatus for system monitoring according to one embodiment of the present invention. The system as illustrated in FIG. 3 is generally indicated by system 300. Specifically, system 300 includes a client monitoring module 301 for monitoring a performance parameter of a client of the system, a determining module 302 for determining based on the performance parameter of the client whether to monitor a service endpoint directly called by the client, a locating module 303 for locating the service endpoint if the determining result is "yes", and a service endpoint monitoring module 304 for monitoring a performance parameter of the service endpoint. In addition, modules 301 through 304 that comprise apparatus 300 correspond respectively to steps 101 through 104 of FIG. 1, which have been described earlier.

Figure 4:
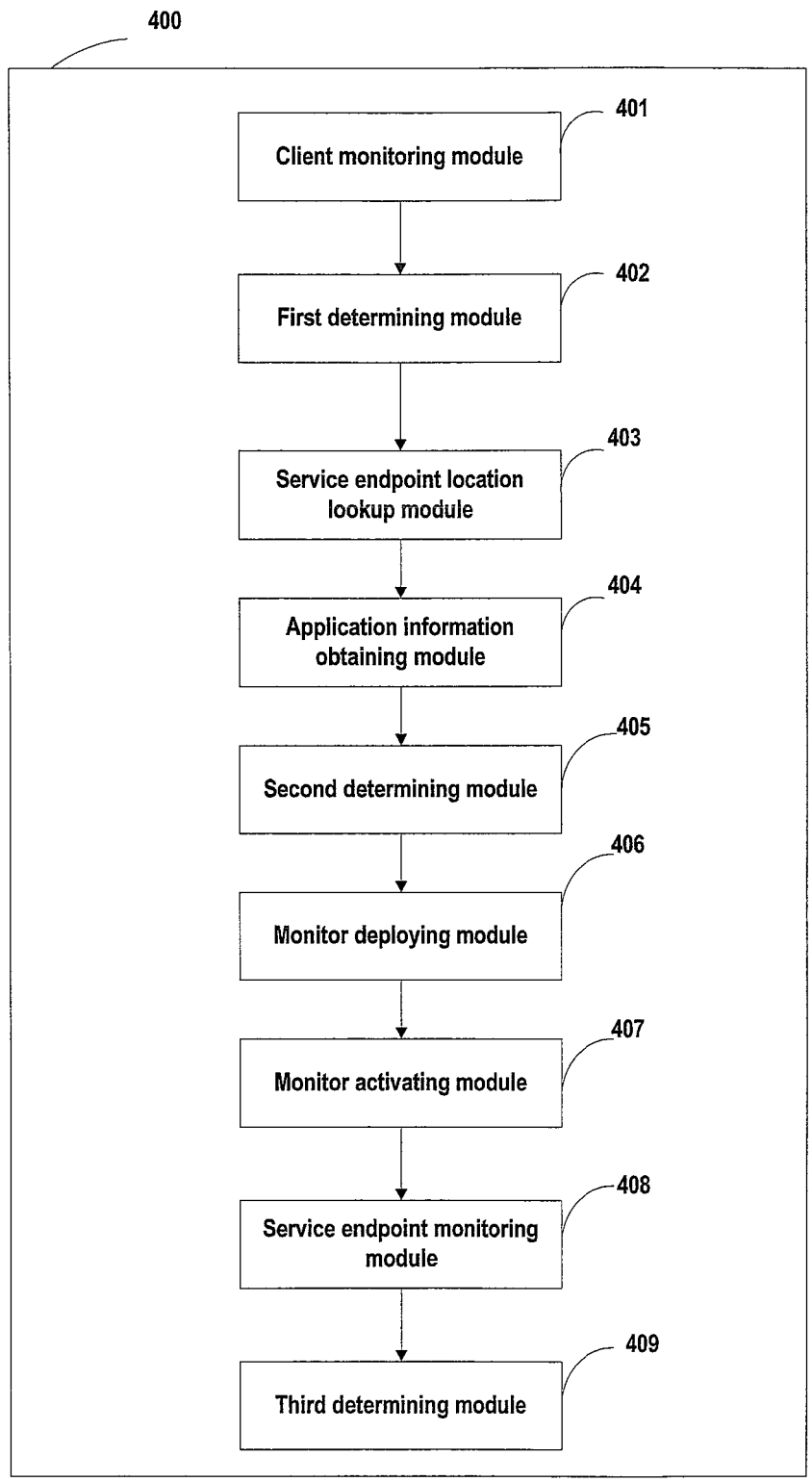
FIG. 4 illustrates a high-level block diagram of an exemplary apparatus for system monitoring in accordance with another embodiment of the present invention.

FIG. 4 illustrates a high-level block diagram of an apparatus for system monitoring according to another embodiment of the present invention. The system as illustrated in FIG. 4 is generally indicated by system 400. Specifically, the system 400 comprises a client monitoring module 401 for monitoring a performance parameter of a client of the system, a first determining module 402 for determining whether a predefined SLA is satisfied based on a performance parameter of the client, a service endpoint locating module 403 for determining an IP address and a port number of the service endpoint when the determining result of the first determining module is "no", an application information obtaining module 404 for obtaining information regarding an application running at the service endpoint, a second determining module 405 for determining whether a corresponding monitor agent has been deployed to the service endpoint, a monitor deploying module 406 for deploying a corresponding monitor agent to the service endpoint when the determining result of the second determining module 405 is "no", a monitor activation module 407 for activating a monitor agent deployed on the service endpoint, a service endpoint monitoring module 408 for monitoring the performance parameter of the service endpoint, and a third determining module 409 for determining whether to monitor a subordinate service endpoint which the service endpoint directly calls. Further, modules 401 through 409 as illustrated in FIG. 4 correspond to steps 201 to 209 in the method of FIG. 2, which will not be detailed here.

Figure 5:
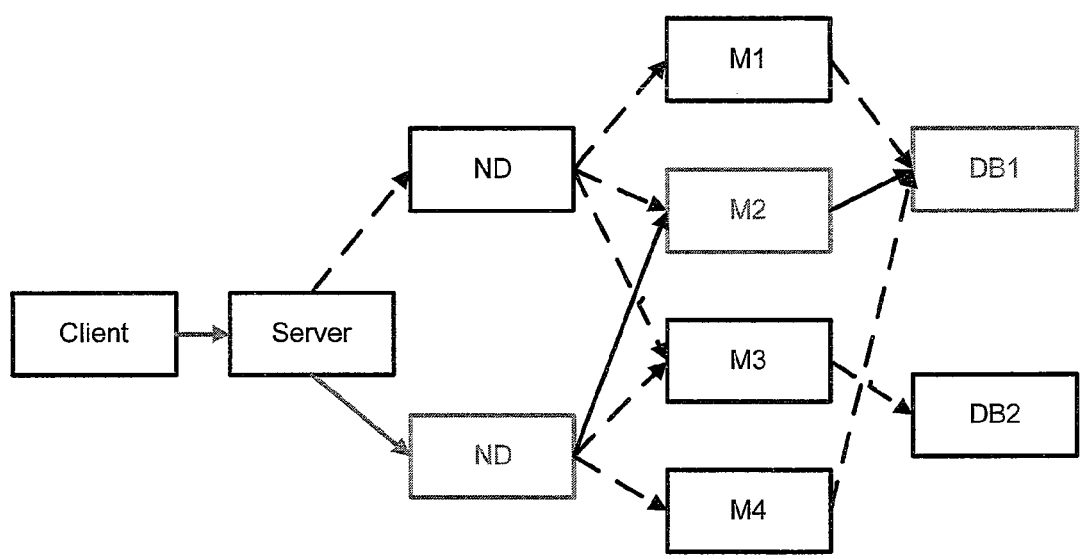
FIG. 5 illustrates a high-level block diagram of a system whose monitoring scope is adjusted in an iterative manner according to one embodiment of the present invention.

FIG. 5 illustrates a block diagram of adjusting system monitoring scope in an iterative manner according to one embodiment of the present invention. As illustrated in FIG. 5, both the solid line arrows and dotted line arrows indicate a call relationship inside the IT system. For example, the arrow pointing to the "server" node from the "client" node indicates that the "client" node directly calls the "server" node. In other words, the "client" node is a "client" with respect to the "server" node, while the "server" node, with respect to the "client" node, is a "service endpoint" directly called by the "client." A solid line arrow indicates a monitoring scope of final deployment, while a dotted line arrow indicates that while such a call relationship exists, it is unnecessary to deploy monitors on the nodes pointed by the dotted line arrow according to the technical solution as proposed by this invention. For example, a monitor agent is deployed initially on the "client" node so as to monitor the performance parameter of the "client" node, and if it is found that the response time of the "client" node to the "server" node which it directly calls is e.g., 800 ms (which is greater than the threshold of 500 ms as prescribed in the SLA), a monitor agent is deployed on the "server" node to monitor the performance parameter of the "server" node. Further, when it is monitored that the response time of the subordinate "ND2" node which is directly called by the "server" node to the request sent by the "server" node is 900 ms (which is greater than the threshold of 600 ms as prescribed in the SLA), it is determined that to deploy a monitor agent on the "ND2" mode, without deploying a monitor agent on the "ND1" node. Applying the problem-oriented, iterative process to this example, it is determined that monitor proxies should be deployed on the "client," "server," "ND2," "M2," and "DB1" nodes, which ultimately determines that the factor causing the performance deterioration of the initial "client" node is the "DB1" node.

Through the above description on the preferred embodiments, those skilled in the art may understand that the above method, system, and computer program product can be implemented with a computer-executable program code stored on computer-readable storage medium/device such as a magnetic disk, CD, DVD-ROM, or programmable memory such as a read-only memory (firmware). The server, client and their components can also be implemented by hardware circuitry of a programmable data processing system, which can include, for example, very large scale integrated (VLSI) circuits, semiconductor chips, and/or field-programmable gate arrays. Alternatively or additionally, the server, client and their components can be implemented with a programmable logical apparatus, or implemented by software executed by various kinds of processors, or implemented by combination of the above hardware circuitry and processor-executable software.

Although the system and method has been described in detail with reference to the preferred embodiments, the present invention is not limited to the embodiments specifically described. A person of normal skill in the art can make various changes, alterations and modifications to the present invention under the teaching of the description without departing from the spirit and scope of the present invention. It should be understood that all such changes, alterations, and modifications still fall into the protection scope of the present invention. The protection scope of the present invention is defined by the appending claims.

What is claimed is:

1. A method for system monitoring in an information technology (IT) system, the method comprising:
a data processing system monitoring a performance parameter of a client of the IT system;
the data processing system determining, based on the performance parameter of the client, whether to monitor a service endpoint directly called by the client;
in response to a determination to monitor the service endpoint directly called by the client, the data processing system locating the service endpoint to be monitored by:
determining an IP address and a port number of the service endpoint directly called by the client; and
obtaining application information regarding an application running on the service endpoint based on the IP address and the port number, wherein the application information includes at least a name and a version number of the application; and
the data processing system monitoring a performance parameter of the service endpoint in response to a determination to monitor the service endpoint by:
determining, based on the obtained application information, whether a monitor agent corresponding to the application has been deployed on the service endpoint;
in response to determining that the monitor agent has not been deployed on the service endpoint, selecting, from among a plurality of monitor agents, the monitor agent corresponding to the application based on the name and version number of the application and a monitor agent mapping data structure, and deploying the monitor agent on the service endpoint;
activating the monitor agent on the service endpoint and monitoring the performance parameter through the monitor agent deployed on the service endpoint.

2. The method according to claim 1, wherein the determining step further comprises:
in response to the performance parameter of the client not satisfying a predefined service level associated with the client, determining to monitor the service endpoint; and
in response to the performance parameter of the client satisfying the predefined service level associated with the client, determining not to monitor the service endpoint.

3. The method according to claim 1, wherein the step of monitoring the performance parameter of the client of the system further comprises:
deploying to the client a monitor agent and activating the monitor agent; and
monitoring the performance parameter of the client through the monitor agent deployed on the client.

4. The method according to claim 1, further comprising:
determining based on the performance parameter of the service endpoint whether to monitor a subordinate service endpoint directly called by the service endpoint;
in response to determining to monitor the subordinate service endpoint:
locating the subordinate service endpoint to be monitored; and
monitoring a performance parameter of the subordinate service endpoint through another monitoring agent deployed to the subordinate service endpoint.

* * * * *